(12) United States Patent
Wolf et al.

(10) Patent No.: US 12,155,706 B2
(45) Date of Patent: *Nov. 26, 2024

(54) LIMITED-ACCESS MEDIA

(71) Applicant: Sonos, Inc., Santa Barbara, CA (US)

(72) Inventors: Brad Wolf, Los Angeles, CA (US); Ben Smith, Santa Barbara, CA (US)

(73) Assignee: Sonos, Inc., Goleta, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/045,312

(22) Filed: Oct. 10, 2022

(65) Prior Publication Data

US 2023/0112260 A1  Apr. 13, 2023

Related U.S. Application Data

(63) Continuation of application No. 17/020,296, filed on Sep. 14, 2020, now Pat. No. 11,470,134, which is a
(Continued)

(51) Int. Cl.
*G06F 15/16*   (2006.01)
*G06F 3/16*    (2006.01)
(Continued)

(52) U.S. Cl.
CPC .............. *H04L 65/60* (2013.01); *G06F 3/165* (2013.01); *H04L 67/10* (2013.01);
(Continued)

(58) Field of Classification Search
CPC ...... G06F 3/165; G06F 17/00; G06F 17/3074; G06F 21/10; G06F 17/30581;
(Continued)

(56) References Cited

U.S. PATENT DOCUMENTS 5,440,644 A   8/1995 Farinelli et al.
5,761,320 A   6/1998 Farinelli et al.
(Continued)

FOREIGN PATENT DOCUMENTS

| EP | 1389853 A1 | 2/2004 |
|---|---|---|
| WO | 200153994 | 7/2001 |
| WO | 2003093950 A2 | 11/2003 |

OTHER PUBLICATIONS

Advisory Action mailed on Oct. 25, 2019, issued in connection with U.S. Appl. No. 14/491,790, filed Sep. 19, 2014, 4 pages.
(Continued)

*Primary Examiner* — Dustin Nguyen
*Assistant Examiner* — Hao H Nguyen

(57) ABSTRACT

An example method involves receiving, by a playback device in a media playback system, limited-access media, where the limited-access media corresponds to a limited-access playback device characteristic. The method may further involve determining, by the playback device, that a particular playback device having the limited-access playback device characteristic is active in the media playback system. Based on determining that the particular playback device having the limited-access playback device characteristic is active in the media playback system, the method may further involve causing the media playback system to play back the limited-access media.

20 Claims, 8 Drawing Sheets

Related U.S. Application Data continuation of application No. 14/491,790, filed on Sep. 19, 2014, now Pat. No. 10,778,739.

(51) Int. Cl.

| | |
|---|---|
| *H04L 65/60* | (2022.01) |
| *H04L 67/10* | (2022.01) |
| *H04N 21/41* | (2011.01) |
| *H04N 21/426* | (2011.01) |
| *H04N 21/436* | (2011.01) |
| *H04N 21/442* | (2011.01) |
| *H04N 21/4627* | (2011.01) |
| *H04N 21/81* | (2011.01) |
| *H04N 21/8355* | (2011.01) |

(52) U.S. Cl.
CPC ... *H04N 21/4122* (2013.01); *H04N 21/42684* (2013.01); *H04N 21/43615* (2013.01); *H04N 21/44227* (2013.01); *H04N 21/4627* (2013.01); *H04N 21/8113* (2013.01); *H04N 21/8355* (2013.01)

(58) Field of Classification Search
CPC .......... G06F 3/048; G06F 3/0484; G06F 3/16; G06F 3/167; H04L 65/60; H04L 67/10; H04L 63/08; H04N 21/43615; H04N 21/242; H04N 21/4122; H04N 21/42684; H04N 21/4307; H04N 21/4627; H04N 21/8113; H04N 5/04
See application file for complete search history.

(56) References Cited

U.S. PATENT DOCUMENTS

| | | | |
|---|---|---|---|
| 5,923,902 A | 7/1999 | Inagaki | |
| 6,032,202 A | 2/2000 | Lea et al. | |
| 6,108,686 A | 8/2000 | Williams, Jr. | |
| 6,256,554 B1 | 7/2001 | DiLorenzo | |
| 6,349,339 B1 | 2/2002 | Williams | |
| 6,404,811 B1 | 6/2002 | Cvetko et al. | |
| 6,469,633 B1 | 10/2002 | Wachter | |
| 6,522,886 B1 | 2/2003 | Youngs et al. | |
| 6,611,537 B1 | 8/2003 | Edens et al. | |
| 6,631,410 B1 | 10/2003 | Kowalski et al. | |
| 6,757,517 B2 | 6/2004 | Chang | |
| 6,778,869 B2 | 8/2004 | Champion | |
| 6,826,283 B1 | 11/2004 | Wheeler et al. | |
| 6,985,694 B1 | 1/2006 | De Bonet et al. | |
| 7,124,125 B2 | 10/2006 | Cook et al. | |
| 7,130,608 B2 | 10/2006 | Hollstrom et al. | |
| 7,130,616 B2 | 10/2006 | Janik | |
| 7,143,939 B2 | 12/2006 | Henzerling | |
| 7,236,739 B2 | 6/2007 | Chang | |
| 7,236,773 B2 | 6/2007 | Thomas | |
| 7,295,548 B2 | 11/2007 | Blank et al. | |
| 7,483,538 B2 | 1/2009 | McCarty et al. | |
| 7,496,623 B2 | 2/2009 | Szeto et al. | |
| 7,496,633 B2 | 2/2009 | Szeto et al. | |
| 7,571,014 B1* | 8/2009 | Lambourne ............. G06F 3/165 | 700/94 |
| 7,599,685 B2 | 10/2009 | Goldberg et al. | |
| 7,630,501 B2 | 12/2009 | Blank et al. | |
| 7,643,894 B2 | 1/2010 | Braithwaite et al. | |
| 7,657,224 B2 | 2/2010 | Goldberg et al. | |
| 7,657,910 B1 | 2/2010 | McAulay et al. | |
| 7,725,533 B2 | 5/2010 | Szeto et al. | |
| 7,725,551 B2 | 5/2010 | Szeto et al. | |
| 7,739,271 B2 | 6/2010 | Cook et al. | |
| 7,742,740 B2 | 6/2010 | Goldberg et al. | |
| 7,835,689 B2 | 11/2010 | Goldberg et al. | |
| 7,853,341 B2 | 12/2010 | McCarty et al. | |
| 7,865,137 B2 | 1/2011 | Goldberg et al. | |
| 7,916,877 B2 | 3/2011 | Goldberg et al. | |
| 7,917,082 B2 | 3/2011 | Goldberg et al. | |
| 7,987,294 B2 | 7/2011 | Bryce et al. | |
| 8,014,423 B2 | 9/2011 | Thaler et al. | |
| 8,023,663 B2 | 9/2011 | Goldberg | |
| 8,028,038 B2* | 9/2011 | Weel ....................... H04L 67/06 | 709/219 |
| 8,028,323 B2 | 9/2011 | Weel | |
| 8,045,952 B2 | 10/2011 | Qureshey et al. | |
| 8,050,652 B2 | 11/2011 | Qureshey et al. | |
| 8,103,009 B2 | 1/2012 | McCarty et al. | |
| 8,131,389 B1 | 3/2012 | Hardwick et al. | |
| 8,214,873 B2 | 7/2012 | Weel | |
| 8,230,099 B2 | 7/2012 | Weel | |
| 8,234,395 B2 | 7/2012 | Millington | |
| 8,483,853 B1 | 7/2013 | Lambourne | |
| 2001/0042107 A1 | 11/2001 | Palm | |
| 2002/0022453 A1 | 2/2002 | Balog et al. | |
| 2002/0026442 A1 | 2/2002 | Lipscomb et al. | |
| 2002/0056117 A1 | 5/2002 | Hasegawa et al. | |
| 2002/0124097 A1 | 9/2002 | Isely et al. | |
| 2003/0157951 A1 | 8/2003 | Hasty, Jr. | |
| 2004/0024478 A1 | 2/2004 | Hans et al. | |
| 2004/0088328 A1 | 5/2004 | Cook et al. | |
| 2005/0251807 A1 | 11/2005 | Weel | |
| 2006/0248557 A1* | 11/2006 | Stark ................... H04N 21/4858 | 725/74 |
| 2006/0253436 A1 | 11/2006 | Cook et al. | |
| 2007/0038999 A1* | 2/2007 | Millington ............... H03G 3/00 | 718/100 |
| 2007/0088747 A1 | 4/2007 | Cheng et al. | |
| 2007/0142944 A1 | 6/2007 | Goldberg et al. | |
| 2007/0294131 A1 | 12/2007 | Roman et al. | |
| 2008/0052371 A1 | 2/2008 | Partovi et al. | |
| 2008/0092211 A1* | 4/2008 | Klemets ................ H04L 9/3247 | 713/176 |
| 2009/0307062 A1 | 12/2009 | Lutnick et al. | |
| 2010/0017366 A1 | 1/2010 | Robertson et al. | |
| 2010/0082725 A1* | 4/2010 | Onishi ................ H04L 12/2821 | 386/241 |
| 2010/0205222 A1 | 8/2010 | Gajdos et al. | |
| 2010/0235224 A1 | 9/2010 | Newman et al. | |
| 2010/0262909 A1 | 10/2010 | Hsieh | |
| 2010/0287609 A1* | 11/2010 | Gonzalez ........... H04N 21/64322 | 726/14 |
| 2011/0055901 A1* | 3/2011 | Karaoguz ............... H04L 9/321 | 713/168 |
| 2011/0106954 A1* | 5/2011 | Chatterjee ............. H04W 12/50 | 709/227 |
| 2011/0219229 A1 | 9/2011 | Cholas et al. | |
| 2012/0071996 A1* | 3/2012 | Svendsen ........... G06Q 30/0202 | 700/94 |
| 2012/0099594 A1* | 4/2012 | Lau ..................... H04L 12/2807 | 370/392 |
| 2013/0173794 A1* | 7/2013 | Agerbak ................ H04W 84/12 | 709/225 |
| 2013/0347018 A1 | 12/2013 | Limp et al. | |
| 2014/0041043 A1 | 2/2014 | Ha et al. | |
| 2014/0129015 A1 | 5/2014 | Lindahl et al. | |
| 2014/0277639 A1* | 9/2014 | Gomes-Casseres .... G06F 3/165 | 700/94 |
| 2015/0082395 A1* | 3/2015 | Zhu ..................... H04L 12/2821 | 726/4 |
| 2016/0006737 A1* | 1/2016 | Barraclough ........ H04N 21/274 | 726/28 |

OTHER PUBLICATIONS

Audio Tron Quick Start Guide, Version 1.0, Mar. 2001, 24 pages.
Audio Tron Reference Manual, Version 3.0, May 2002, 70 pages.
Audio Tron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.

(56) References Cited

OTHER PUBLICATIONS

Dell, Inc. "Start Here," Jun. 2000, 2 pages.
"Denon 2003-2004 Product Catalog," Denon, 2003-2004, 44 pages.
European Patent Office, European Office Action mailed on Jul. 31, 2017, issued in connection with EP Application No. 15778802.7, 6 pages.
European Patent Office, Office Action mailed on Jan. 12, 2017, issued in connection with European Application No. 15778802.7, 8 pages.
European Patent Office, Summons to Attend Oral Proceedings mailed on Nov. 2, 2018, issued in connection with European Application No. 15778802.7, 10 pages.
Final Office Action mailed on Mar. 8, 2017, issued in connection with U.S. Appl. No. 14/491,790, filed Sep. 19, 2014, 29 pages.
Final Office Action mailed on Aug. 9, 2019, issued in connection with U.S. Appl. No. 14/491,790, filed Sep. 19, 2014, 34 pages.
Final Office Action mailed on Mar. 8, 2018, issued in connection with U.S. Appl. No. 14/491,790, filed Sep. 19, 2014, 31 pages.
First Action Interview Office Action mailed on Sep. 8, 2016, issued in connection with U.S. Appl. No. 14/491,790, filed Sep. 19, 2014, 7 pages.
International Searching Authority, International Preliminary Report on Patentability mailed on Mar. 30, 2017, issued in connection with International Application No. PCT/US2015/050799 filed on Sep. 17, 2015, 10 pages.
International Searching Authority, International Search Report and Written Opinion mailed on Dec. 1, 2015, issued in connection with International Application No. PCT/US2015/050799, filed on Sep. 17, 2015, 14 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action mailed on Dec. 2, 2019, issued in connection with U.S. Appl. No. 14/491,790, filed Sep. 19, 2014, 36 pages.
Non-Final Office Action mailed on Oct. 16, 2017, issued in connection with U.S. Appl. No. 14/491,790, filed Sep. 19, 2014, 31 pages.
Non-Final Office Action mailed on Oct. 16, 2018, issued in connection with U.S. Appl. No. 14/491,790, filed Sep. 19, 2014, 30 pages.
Non-Final Office Action mailed on Oct. 4, 2021, issued in connection with U.S. Appl. No. 17/020,296, iled on Sep. 14, 2020, 44 pages.
Notice of Allowance mailed on Apr. 17, 2020, issued in connection with U.S. Appl. No. 14/491,790, filed Sep. 19, 2014, 28 pages.
Notice of Allowance mailed on May 31, 2022, issued in connection with U.S. Appl. No. 17/020,296, filed Sep. 14, 2020, 19 pages.
Palm, Inc., "Handbook for the Palm VII Handheld," May 2000, 311 pages.
Preinterview First Office Action mailed on Jul. 7, 2016, issued in connection with U.S. Appl. No. 14/491,790, filed Sep. 19, 2014, 5 pages.
Presentations at WinHEC 2000, May 2000, 138 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

\* cited by examiner

LIMITED-ACCESS MEDIA

CROSS REFERENCE TO RELATED APPLICATIONS

This application is a continuation of and claims priority to U.S. patent application Ser. No. 17/020,296, filed on Sep. 14, 2020, entitled "Limited-Access Media," which is a continuation of U.S. patent application Ser. No. 14/491,790, filed on Sep. 19, 2014 and issued as U.S. Pat. No. 10,778,739, entitled "Limited-Access Media," the contents of each of which are hereby incorporated by reference in their entirety.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
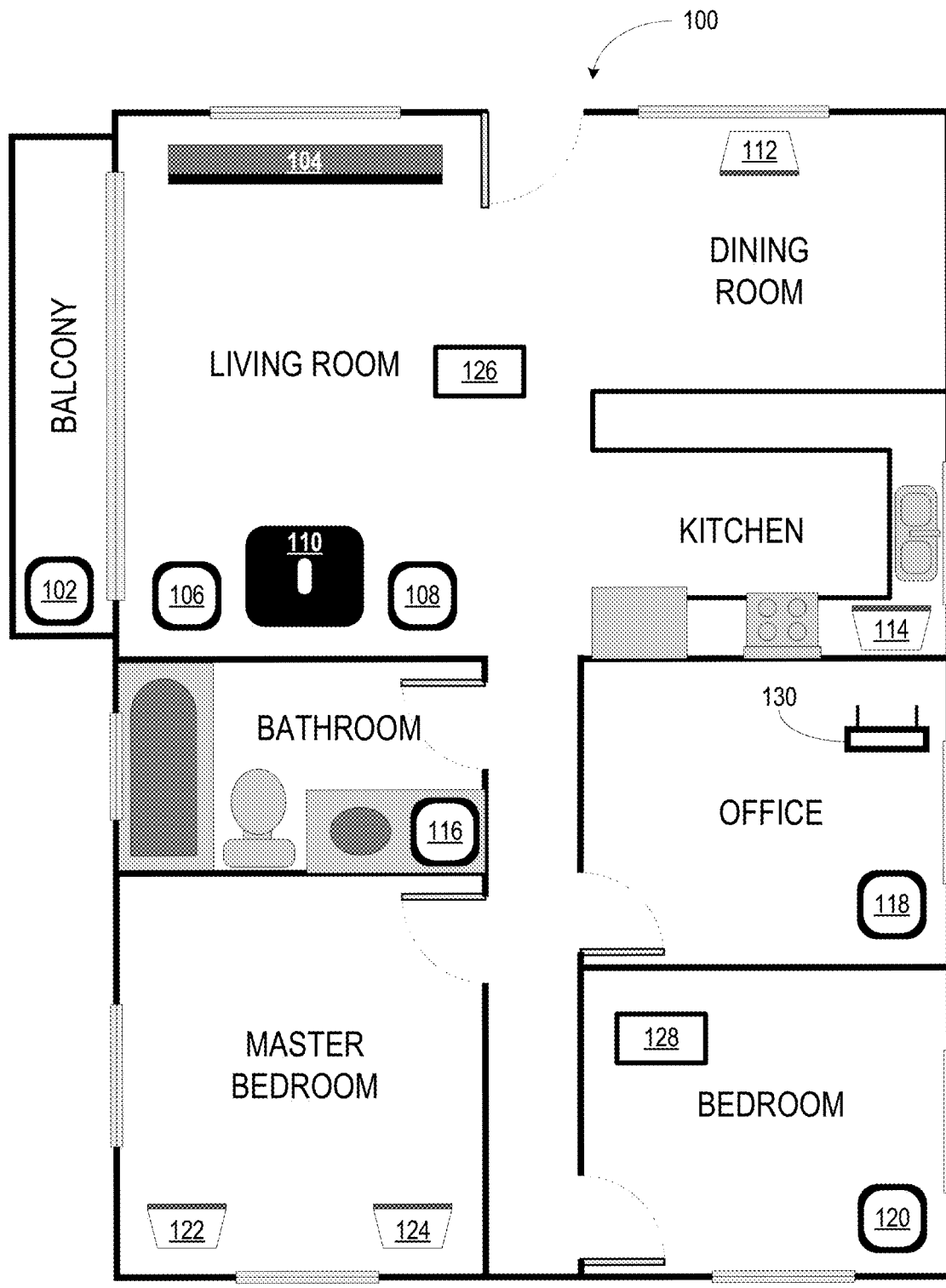
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Examples described herein generally involve the play back of limited-access media. The limited-access media may be an internet radio channel, on-demand style media content, or other media content that is accessible by certain media playback systems and may be available for a play back on a restricted basis, such as for limited period of time, among other examples.

A media playback system may gain access to limited-access media based on the presence of a particular playback device in the media playback system. The particular playback device may have a limited-playback device characteristic, such as a specific model number, that corresponds to the limited-access media. In some implementations, play back of the limited-access media may be limited to the particular playback device. In other implementations, other playback devices in the media playback system may play back the limited-access media as well, with or without simultaneous play back by the particular playback device.

As indicated above, examples described herein involve the play back of limited-access media by a media playback system based on the presence of a particular playback device within the media playback system. In one aspect, a playback device is provided. The playback device includes a processor, a network interface, a non-transitory computer-readable medium, and program instructions stored on the non-transitory computer-readable medium that, when executed by the processor, cause the playback device to perform functions including a) receiving, by the playback device, limited-access media, where the limited-access media corresponds to a limited-playback device characteristic; b) determining that a particular playback device having the limited-playback device characteristic is active in a media playback system, where the particular playback device is within the media playback system; and c) based on determining that the particular playback device having the limited-playback device characteristic is active in the media playback system, causing the media playback system to play back the limited-access media.

In another aspect, a method is provided. The method involves receiving, by a computing system, an identification message comprising a device identifier of a particular playback device in a media playback system; determining, based on the received device identifier, that the media playback system is permitted to access limited-access media, where the limited-access media corresponds to a limited-access playback device characteristic of the particular playback device; and based on the determination that the media playback system is permitted to access the limited-access media, causing the limited-access media to be available for play back by the media playback system.

In yet another aspect, a method is provided. The method involves receiving, by a playback device in a media playback system, limited-access media, where the limited-access media corresponds to a limited-access playback device characteristic; determining, by the playback device, that a particular playback device having the limited-access playback device characteristic is active in the media playback system; and based on determining that the particular playback device having the limited-access playback device characteristic is active in the media playback system, causing the media playback system to play back the limited-access media It will be understood by one of ordinary skill in the art that this disclosure includes numerous other embodiments. It will be understood by one of ordinary skill in the art that this disclosure includes numerous other embodiments. While some examples described herein may refer to functions performed by given actors such as "users" and/or other entities, it should be understood that this description is for purposes of explanation only. The claims should not be interpreted to require action by any such example actor unless explicitly required by the language of the claims themselves.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
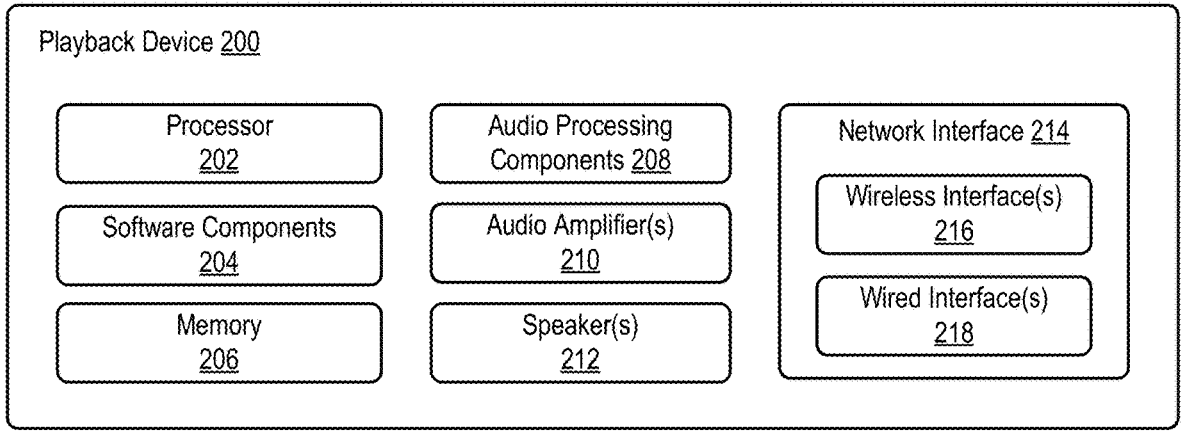
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
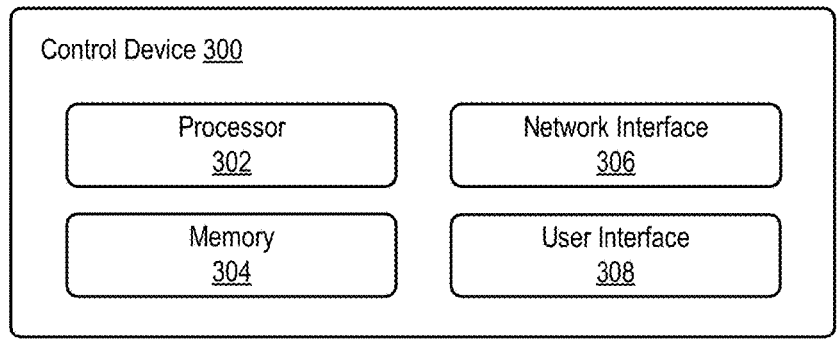
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
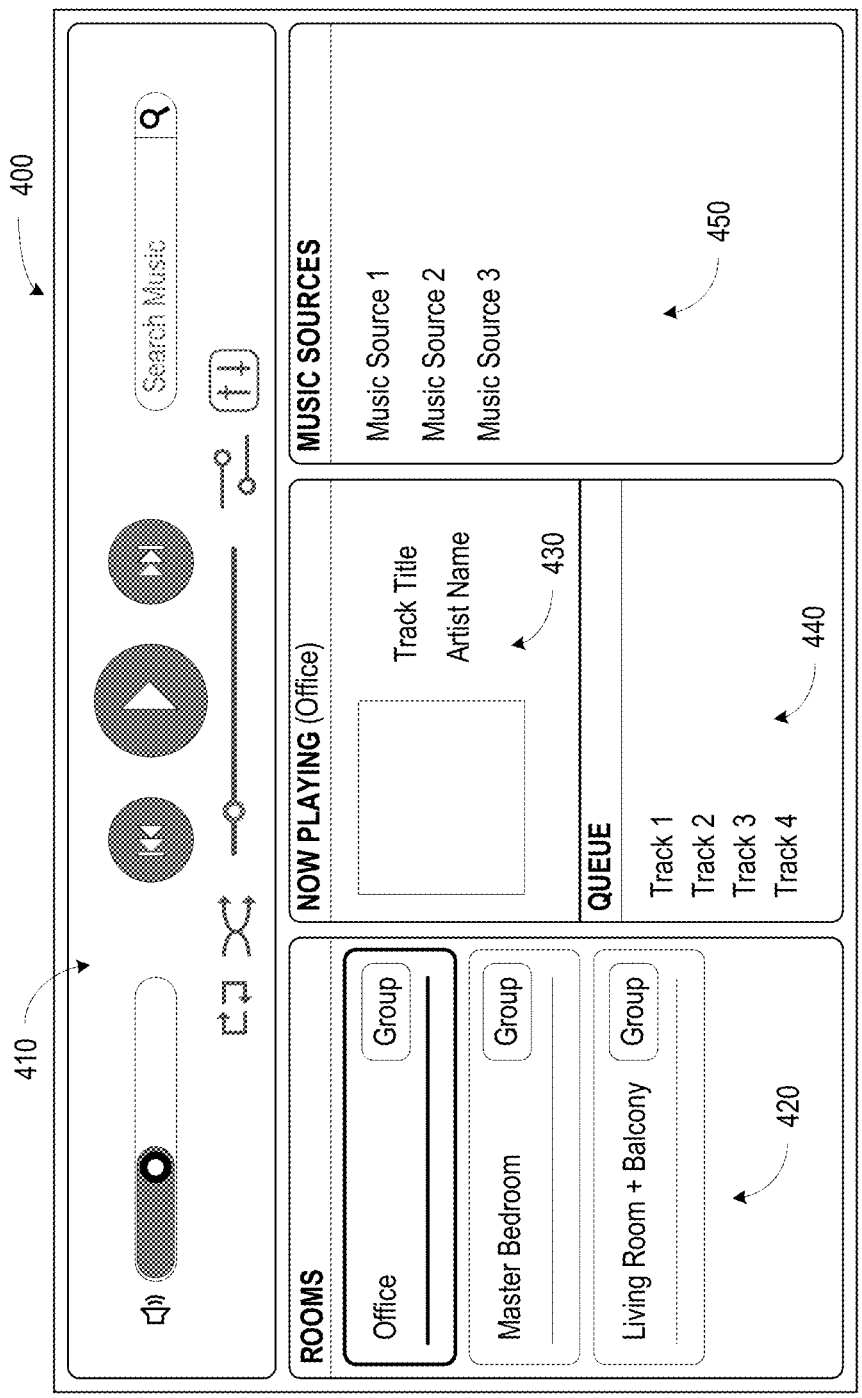
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

III. Facilitating Playback of Limited-Access Media

As discussed above, examples described herein may involve the play back of limited-access media by a media playback system based on the presence of a particular playback device within the media playback system.

In this section the term "computing device" may have the same meaning as the terms "network device" and/or "controller device" used in previous sections, unless it is clear from context that this is not the case. The term "server" may also be used interchangeably with the term "server device." Terminology such as "server," "server device," "controller," "controller device," "network device," "computing system," and "computing device" are generally used for explanatory purposes in this disclosure and are not meant to be limiting. One of skill in the art will recognize that any suitable computing device may perform various functions disclosed herein and that the preceding list of terms is non-exhaustive.

Figure 5:
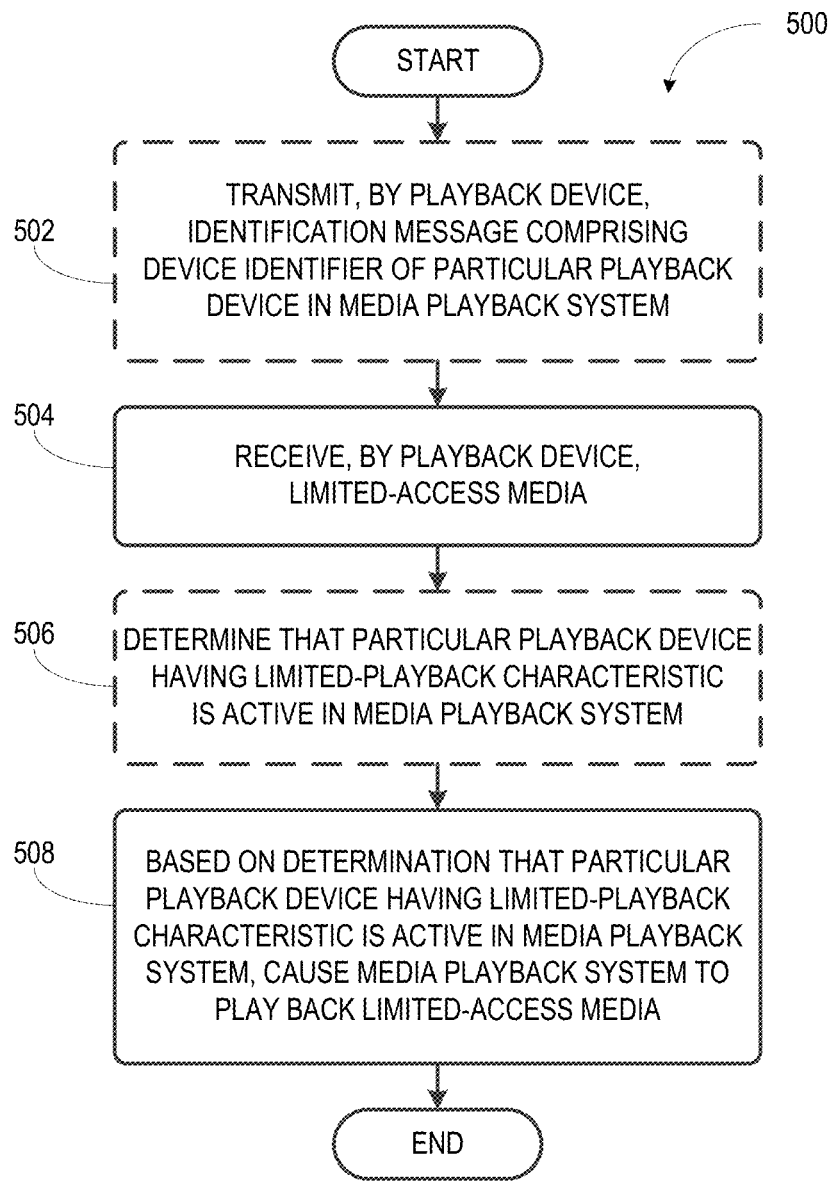
FIG. 5 shows an example flow diagram for an example method to facilitate the play back of limited-access media.

In the examples herein, certain functions are described as being attributed to or carried out by a given device in a media playback system. However, the functions may be carried out by other devices in the system as well. For example, some of the functions in the method 500 shown in FIG. 5 are described with respect to a playback device, but those functions could also be carried out by a control device or a remote device, such as a server. Other examples are also possible.

Figure 8:
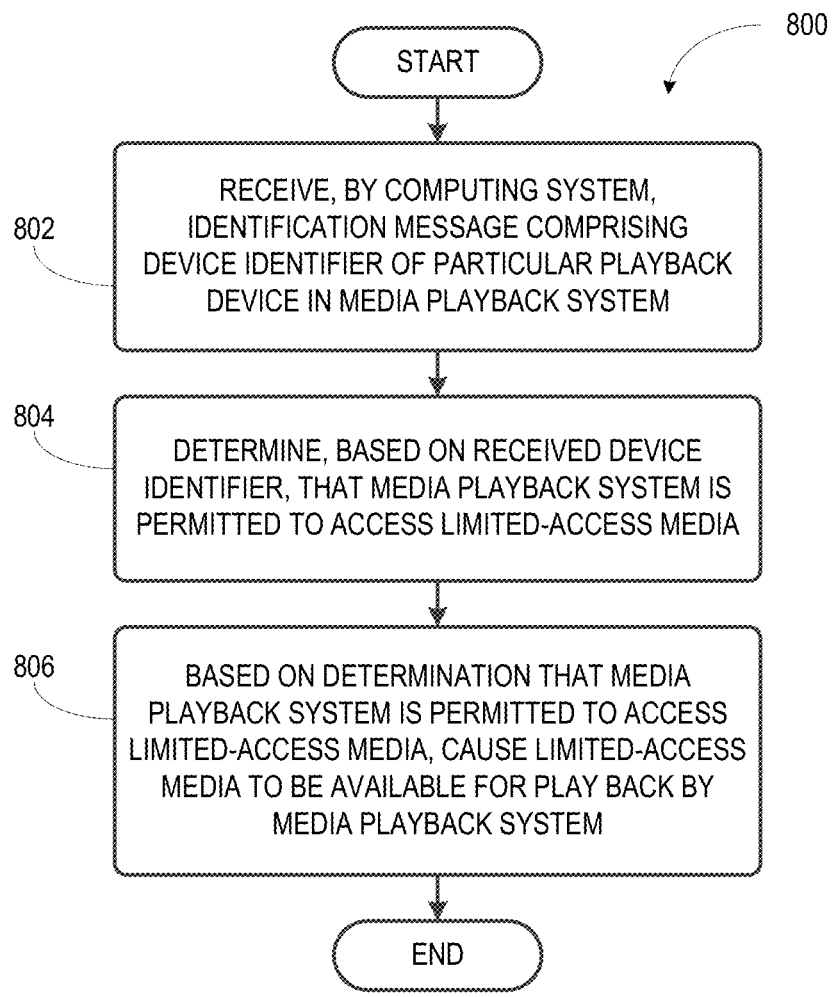
FIG. 8 shows an example flow diagram for another example method to facilitate the play back of limited-access media.

Methods 500 and 800 shown in FIGS. 5 and 8 present embodiments of methods that can be implemented within an operating environment involving, for example, the media playback system 100 of FIG. 1, one or more of the playback device 200 of FIG. 2, and one or more of the control device 300 of FIG. 3. Methods 500 and 800 may include one or more operations, functions, or actions as illustrated by one or more of blocks shown in FIGS. 5 and 8. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the methods 500 and 800 and other processes and methods disclosed herein, the flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the methods 500 and 800 and other processes and methods disclosed herein, each block in FIGS. 5 and 8 may represent circuitry that is wired to perform the specific logical functions in the process.

a. First Example for Facilitating Playback of Limited Access Media

Figure 6:
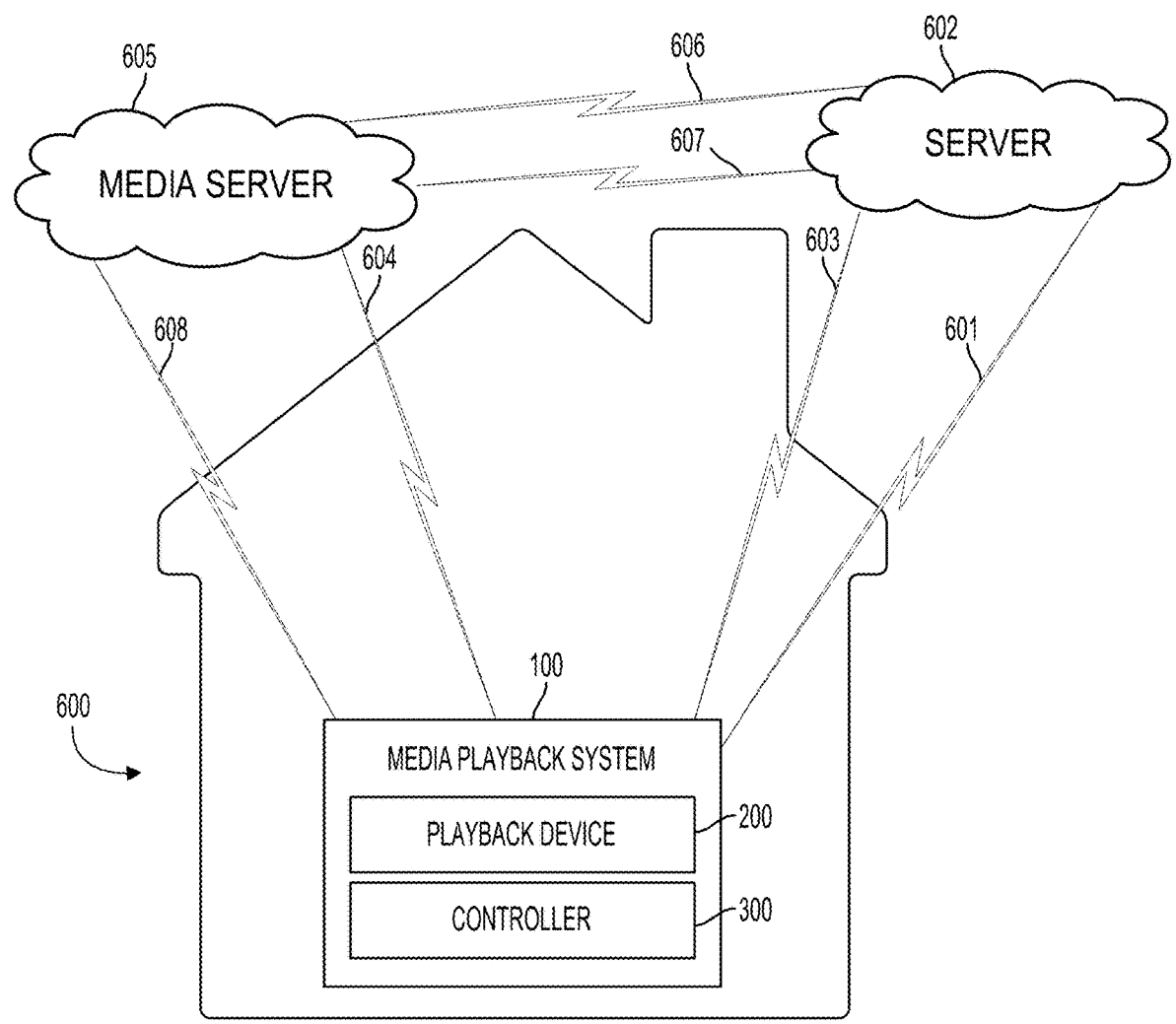
FIG. 6 shows example events and example devices for facilitating the play back of limited-access media.

At block 502 of the method 500, a playback device in a media playback system may transmit an identification message including a device identifier of a particular playback device in the media playback system. For example, the playback device may be the playback device 200 of FIG. 2, and the media playback system may be the media playback system 100 of FIG. 1. FIG. 6 shows an example operating environment 600 in accordance with at least some embodiments described herein, including the media playback system 100, the playback device 200, and a control device control device 300, such as the control device 300 of FIG. 3. In some embodiments, the control device 300 may transmit the identification message instead of, or in addition to, the playback device 200 transmitting the identification message.

In some examples, the particular playback device discussed in block 502 may be the playback device 200 that transmits the identification message. For instance, the playback device 200 shown in FIG. 6 may be the particular playback device. Alternatively, the particular playback device may be another playback device in the media playback system 100 that is in communication with the playback device 200, which may be a zone coordinator, for instance. The device identifier of the particular playback device may include a number that identifies the particular playback device, such as a serial number. Other device identifiers are also possible and may include letters, numbers, or other data that may identify the particular playback device.

The particular playback device may have a limited-playback device characteristic, which may correspond to limited-access media. For instance, the limited-playback device characteristic may be a particular model of playback device, having a particular model number, which may correspond to the limited-access media. The characteristic may additionally or alternatively be a technical configuration of the particular playback device, which may include specialized sound equalization settings, or a particular file stored in the memory of the particular playback device. For instance, the limited-playback device characteristic may be a token stored on the particular playback device that indicates a right to access the limited-access media. Other possibilities also exist.

The limited-access media may be a radio channel "ABC", and the model of playback device may be an "ABC" model. As additional examples, the limited-access media may be radio or on-demand style content corresponding to a media curating service (e.g., BLUE NOTE®, SLACKER®, BEATS MUSIC®) "DEF", a media provision service (e.g., SPOTIFY®, PANDORA®, RHAPSODY®, BEATS™ MUSIC, etc.) "GHI", or a media owner (e.g., UNIVERSAL MUSIC GROUP®, SONY MUSIC ENTERTAINMENT®, etc.) "JKL". Accordingly, the limited-playback device characteristic may be a "DEF", "GHI", or "JKL" model playback device, respectively. Numerous other examples of limited-access media are also possible, as well as additional examples of limited-playback device characteristics.

In some examples, the limited-access media may be available for a predetermined, limited time period. For instance, the limited time period may be two weeks, three months, or a specific date range, among other examples. In some cases, the limited-access media may include a preview of media content that will become more widely available, and the limited time period may correspond to a promotional period just prior to the wider release of the media content. As another example, the limited-access media may correspond to an event, such as a sporting event, and may be available for a period of time corresponding to the sporting event. As yet another example, the limited-access media may be seasonal in nature, such as music corresponding to a given holiday, and the limited-time period may correspond to the days or weeks leading up to the given holiday. Other possibilities also exist.

At the end of the limited time period, the limited-access media may be available for playback by any device (i.e., it may no longer be limited-access), or it may no longer be available at all. Further, the same or additional limited-access media corresponding to the limited-playback device characteristic may later become available, for similarly limited time periods.

The device identifier discussed above may, in addition to identifying the particular playback device, include an indication of the limited-playback device characteristic. For instance, a particular playback device's serial number, if it is within a given range and/or includes a given combination of letters or numbers, may indicate that the particular playback device is a given model of playback device. This may indicate that the particular playback device has the limited-playback device characteristic. Other possibilities also exist.

As shown in FIG. 6, the playback device 200 may transmit 601 the identification message including the device identifier of the particular playback device to a computing system, such as a server 602. The server 602 may, based on the device identifier, determine that the media playback system 100 is permitted to access the limited-access media. The server 602 may further cause the limited-access media to be available for playback by the media playback system 100. For instance, in some examples, the playback device 200 may receive 603 a token from the server 602 that indicates a right to access the limited-access media. Additionally or alternatively, the playback device 200 may receive from the server 602 data indicating the limited-access media. The playback device 200 may then cause the indication of the limited-access media to be displayed on the control device 300, thereby causing the limited-access media to be selectable for playback by the media playback system 100. Other examples are also possible.

In some example embodiments, step 502 of the method 500 may be optional, as it might not be necessary for the playback device 200 to transmit the identification message. For instance, the limited-playback device characteristic of the particular playback device may include the presence of the token, or other data stored in memory of the particular playback device. In an example where the particular playback device is not the playback device 200, the particular playback device may transmit the token or other data to the playback device 200 or the control device 300 for use in accessing the limited-access media. Thus, the playback device 200 might not need to obtain the token from the server 602.

In some embodiments, the playback device 200 may request the limited-access media based on receiving data from the control device 300 indicating a request for the limited-access media. For example, as shown in FIG. 6, the playback device 200 may request 604 the limited-access media from a computing system, such as the media server 605. In some examples, the control device 300 may request the limited-access media from the media server 605. Alternatively, the playback device 200 and/or control device 300 may request 604 the limited-access media from the server 602. In other words, the server 602 and the server 605 shown in FIG. 6 may be the same computing system.

Further, the playback device 200 may transmit, either in conjunction with or separately from the request, the token indicating the right to access the limited-access media. In FIG. 6, the token may be transmitted 604 along with the request for the limited-access media. In some cases, the media server 605 may verify the token before providing the limited-access media. Alternatively, the media server 605 may send 606 a message to the server 602 to validate the token. The server 602 may then send 607 a confirmation message to the media server 605 indicating that the token is valid.

At block 504, the playback device 200 may receive the limited-access media, where the limited-access media corresponds to the limited-playback device characteristic. For example, as shown in FIG. 6, the playback device 200 may receive 608 the limited-access media from the media server 605. The limited-access media may correspond to the limited-playback device characteristic as discussed above.

At block 506, the playback device 200 may determine that the particular playback device having the limited-playback device characteristic is active in the media playback system 100 and within the media playback system 100. In examples, the playback device 200 may determine that the particular playback device is powered on, registered with the media playback system 100, and/or in communication with the playback device 200 via a local area network utilized by the media playback system 100. As another example, the playback device 200 may determine that the particular playback device is currently playing back media. Other examples and criteria for determining that the particular playback device is active within the media playback system 100 are also possible.

In some cases, the token might not be required to receive 608 the limited-access media from the media server 605. Rather, the playback device 200 may receive 608 the limited-access media from the media server 605 and then determine, based on the determination that the particular playback device is active in the media playback system 100, that the limited-access media may be played back by the media playback system 100. In this way, the playback device 200 may regulate the play back of limited-access media by the media playback system 100.

Based on the determination that the particular playback device having the limited-playback device characteristic is active in the media playback system 100, the playback device 200 may also determine which playback device(s) may play back the limited-access media. For instance, in some embodiments, the playback device 200 may determine that only the particular playback device may play back the limited-access media. As another example, the playback device 200 may determine that the particular playback device and one or more additional playback devices that are bonded with, or share a zone with, the particular playback device may play back the limited-access media.

As yet another example, the playback device 200 may determine that the limited-access media may be played back by one or more playback devices in the media playback system 100 other than the particular playback device. In this case, based on the determination that the particular playback device having the limited-playback device characteristic is active in the media playback system 100, any playback device in the system 100 may play back the limited-access media, regardless of whether the particular playback device is also playing back the limited-access media.

For example, the control device 300 may direct a first playback device in the media playback system to play back the limited-access media. However, the first playback device might not be the particular playback device having the limited-playback device characteristic. Nonetheless, another device in the media playback system, such as the control device 300 or a playback device, may determine that a second playback device active in the system is a particular playback device having the limited-playback device characteristic, and thus determine that the first playback device is permitted to play back the limited-access media.

The determination at block 506 that the particular playback device having the limited-playback device characteristic is active in the media playback system 100 may, in some instances, be optional. For instance, the playback device 200 may transmit the identification message at block 502 to a computing system that includes both server 602 and media server 605. The identification message may further include a request to access the limited-access media. Based on the identification message, the computing system may send the limited-access media to the media playback system 100. Thus, the playback device 200 might not need to determine that the particular playback device 200 is active in the media playback system to gain access to the limited-access media.

In some embodiments, the playback device 200 may, based on the determination that the particular playback device having the limited-playback device characteristic is active in the media playback system 100, send an indication of the limited-access media to the control device 300. The control device 300 may then display the indication of the limited-access media. The display of the limited-access media on the control device 300 may be based on permissions determined by playback device 200. For example, as discussed above, the playback device 200 may determine that the limited-access media may be played by certain playback devices in the media playback system 100.

Figure 7B:
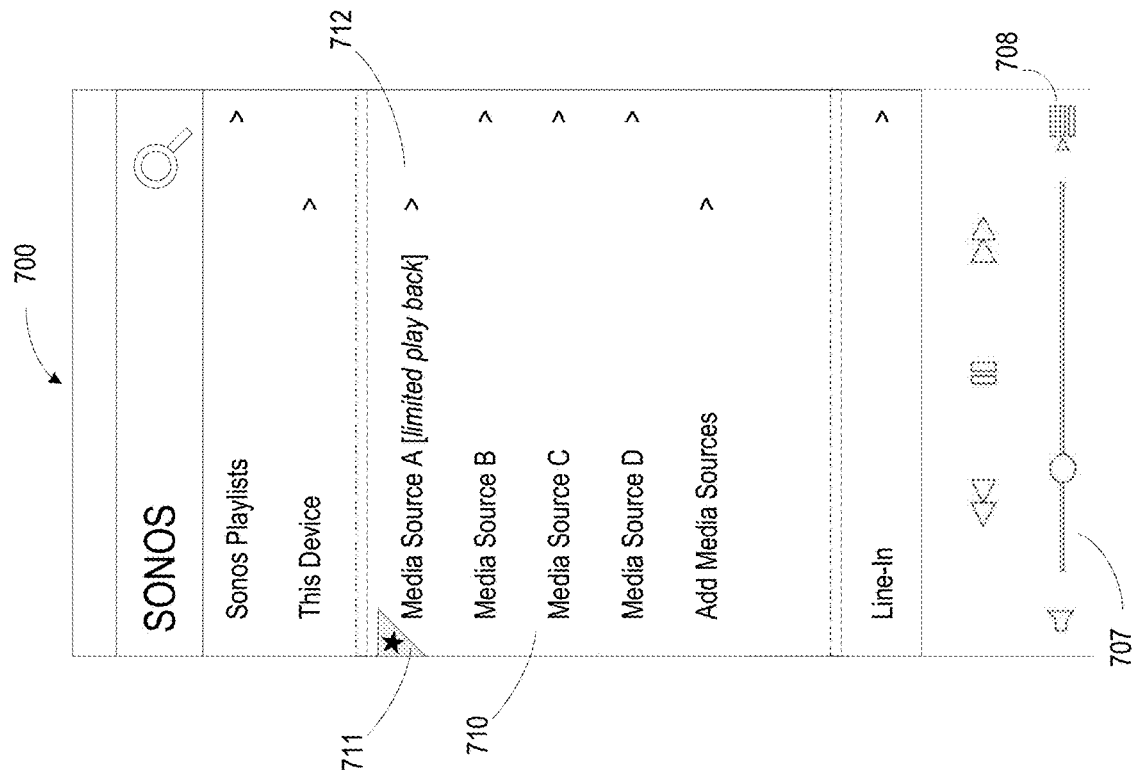
FIG. 7B shows another example indication of limited-access media displayed via a graphical display.
Figure 7A:
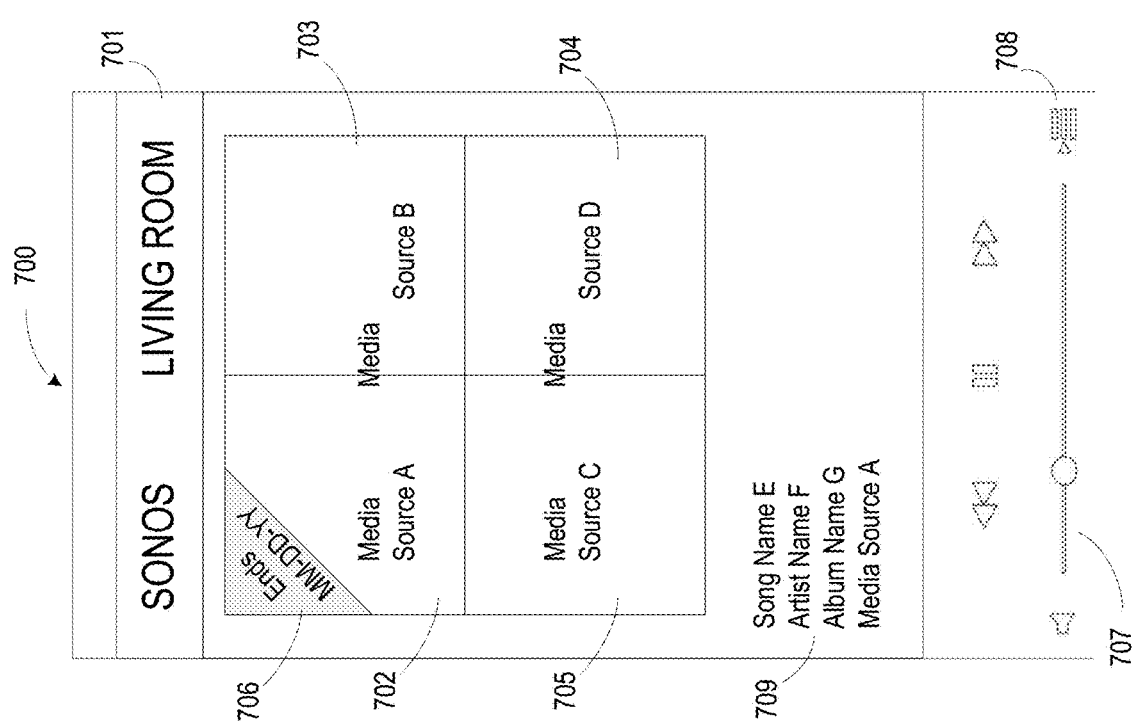
FIG. 7A shows an example indication of limited-access media displayed via a graphical display.

FIGS. 7A-7B show examples of a graphical display 700 of a control device 300 in the media playback system 100. In the examples shown in FIGS. 7A-7B, the playback device 200 has determined that the particular playback device and one or more additional playback devices that are bonded with, or share a zone with, the particular playback device may play back the limited-access media. Further, the playback device 200 may be the playback device 118 shown in FIG. 1, and the particular playback device having the limited-playback device characteristic may be the playback device 108 shown in FIG. 1.

FIG. 7A shows the graphical display 700, which may display playback information for a particular zone 701 in the media playback system 100. The zone 701 may be indicated on the display 700. In FIG. 7A, the zone 701 is the Living Room zone. In this example, the Living Room zone may include playback devices 104, 106, and 110, each of which may be bonded with the particular playback device 108, allowing the Living Room zone to play back the limited-access media. Thus, the graphical display 700 may display an indication 702 of the limited-access media among indications 703-705 of other media available for play back.

Further, the graphical display 700 may display an indication 706 that access to the limited-access media is limited. For instance, the indication 706 may include one or more of highlighting, a flag, text, or any other indication that may indicate that access to the limited-access media is limited. Additionally or alternatively, the indication 706 may in some cases indicate a limited time period for which the limited-access media will be available. In FIG. 7A, the indication 706 appears as a banner in the corner of the indication 702 of the limited-access media, including text that indicates a date when access to the limited-access media will end. The graphical display 700 may also include indications as well, such as media playback controls 707, a menu button 708 for accessing additional features, and an indication 709 of the media currently playing in the zone 701. Other examples are also possible.

In another example (not shown), the graphical display 700 may display playback information for a different zone in the media playback system 100, such as the Office zone. Because the Office zone contains only playback device 118, which is not bonded with the particular playback device in this example, the limited-access media is not available for playback in the Office zone. Thus, the graphical display 700 would not display the indication 702 of the limited-access media for playback by the Office zone.

FIG. 7B shows another example of the graphical display 700, here displaying a menu that includes a list 710 of all media sources that are available to the media playback system 100. A given media source may provide access to limited-access media, media that is not limited-access, or, in some instances, both. The list 710 may therefore include an indication 711 that the media source includes access to limited-access media. For example, the indication 711 may include one or more of highlighting, a flag, text, or any other indication that may indicate that the media source includes access to limited-access media. In FIG. 7B, the indication 711 includes a banner with a star in the corner of the Media Source A on the list 710. Other possibilities exist.

Similarly, the list 710 may include an indication that a given media source may provide access to limited-access media that is playable by less than all of the playback devices in the media playback system 100. For instance, in some examples, the limited-access media may only be played back by the particular playback device and playback devices bonded with it. Accordingly, the list 710 may include an indication 712 to indicate that the limited-access media cannot be played back by every playback device in the system 100. In FIG. 7B, the indication 712 appears as additional text following the text of Media Source A on the list 710. Alternatively, the indication 712 may take the form of an icon as discussed above, or specialized text for Media Source A, such as a different font size, color, and the like. Other examples are also possible.

At block 508, the playback device 200 may, based on the determination that the particular playback device having the limited-playback device characteristic is active in the media playback system 100, cause the media playback system 100 to play back the limited-access media. In an examples, the playback device 200 may cause only the particular playback device to play back the limited-access media. In another example, the playback device 200 may cause the particular playback device, as well as additional playback devices in the media playback system 100 that are bonded with, or that share a zone with, the particular playback device, to play back the limited-access media.

As yet another example, the playback device 200 may cause one or more playback devices other than the particular playback device to play back the limited-access media. In this case, the presence of the particular playback device, active in the media playback system 100, may be all that is necessary for any given playback device in the media playback system 100 to play back the limited-access media.

In some embodiments, the limited-access media may include one or more play back characteristics and the particular playback device having the limited-playback device characteristic may be configured based on the one or more play back characteristics of the limited-access media. For example, the limited-access media may include an Internet radio channel that provides access to dance music. Accordingly, the particular playback device may be tuned such that its audio equalization settings are optimized for a given sound profile that may be desirable for dance music. For instance, the particular playback device may be configured to have a higher bass output than a typical playback device. Other examples of play back characteristics for the limited-access media are also possible, as well as additional examples for how the particular playback device may be configured in a way that corresponds to the play back characteristic.

In some further embodiments, the playback device 200 may, before causing the particular playback device to play back the limited-access media, cause the particular playback device to adjust its configuration in a way that corresponds to the play back characteristic of the limited-access media. For example, the particular playback device may be initially configured with audio equalization settings that are typical of other playback devices in the media playback system 100. But when the particular playback device plays back the limited-access media, its audio equalization setting may be adjusted to correspond to the play back characteristic of the limited-access media, as discussed above.

The adjusted equalization settings corresponding to the limited-access media may be stored locally on the particular playback device, provided by the server 602, or transmitted along with the limited-access media. For example, the equalization settings may be included as metadata within an audio stream that includes the limited-access media. Other examples are also possible. Further, the particular playback device may be capable of multiple different configurations that correspond to the limited-access media.

When the particular playback device again plays back media that is not limited-access, the playback device 200 may cause the particular playback device to revert to its original configuration. Other possibilities also exist.

b. Second Example for Facilitating Playback of Limited Access Media

Figure 9:
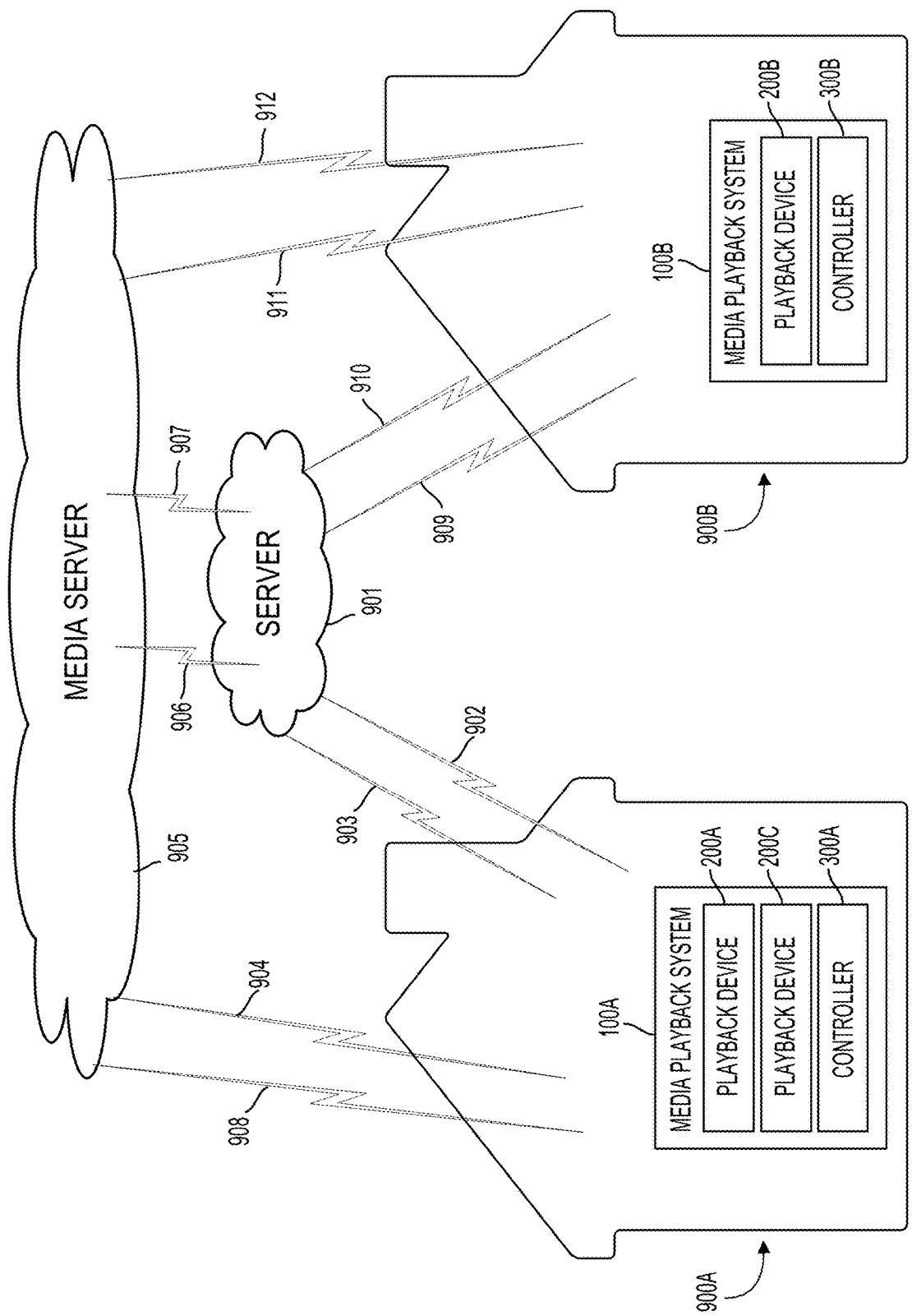
FIG. 9 shows example events and example devices for facilitating the play back of limited-access media.

At block 802 of the method 800, a computing system may receive an identification message including a device identifier of a particular playback device in a media playback system. The computing system may be a server, such as the server 901 shown in the example of FIG. 9. FIG. 9 illustrates an example operating environment 900A according to some embodiments described herein. The server 901 may be in communication with the media playback system 100A, which may be analogous to the media playback system 100 of FIG. 1. The media playback system 100A may also include a playback device 200A that may communicate with the server 901, including sending 902 the identification message to the server 901. The server 901 may receive the identification message including the device identifier from other sources as well.

The playback device 200A may be analogous to the playback device 200 of FIG. 2. In some cases, the playback device 200A may be the particular playback device discussed in block 802. In other examples, including the example shown in FIG. 9, the particular playback device may be a separate playback device 200C, which may also be analogous to the playback device 200 of FIG. 2. The device identifier of the particular playback device 200C may include a number that identifies the particular playback device 200C, such as a serial number. Other device identifiers are also possible and may include letters, numbers, or other data that may identify the particular playback device.

At block 804, the server 901 may determine, based on the received device identifier, that the media playback system 100A is permitted to access limited-access media, where the limited-access media corresponds to a limited-playback device characteristic of the particular playback device. The limited-playback device characteristic may take one or more forms, as discussed above. Further, the limited-access media, may include various types of media content from various sources, also discussed above.

The determination that the media playback system 100A is permitted to access limited-access media may generally involve determining that a particular playback device is within the media playback system 100A. In some examples, the server 901 may determine that the media playback system 100A is permitted to access limited-access media by comparing the received device identifier to a list of particular playback device identifiers. Then, based on the comparison, the server 901 may determine that the device identifier is on the list. For example, the server 901 may have stored in memory a list of serial numbers that correspond to playback devices having the limited-playback device characteristic (e.g., all playback devices of a particular model). In this way, the device identifier may, in addition to identifying the particular playback device, include an indication of the limited-playback device characteristic.

As another example, the server 901 may analyze the received device identifier, such as a serial number, to determine whether it is within a given range. In this way, the server 901 may only need to store in memory two serial numbers—the upper and lower bound of the range—rather than a list of every particular playback devices having the limited-playback device characteristic. Other examples for how the server 901 may determine that the media playback system 100A is permitted to access limited-access media based on the received device identifier are also possible.

At block 806, the server 901 may, based on the determination that the media playback system 100A is permitted to access the limited-access media, cause the limited-access media to be available for play back by the media playback system 100A. In some cases, the server 901 may transmit data indicating the limited-access media. For instance, the server 901 may transmit 903 data indicating the limited-access media to the media playback system 100A, which might not otherwise have access to such data. The playback device 200A may then cause an indication of the limited-access media to be displayed the graphical display of a control device 300A, as discussed above and generally shown in FIG. 7A-7B, allowing the limited-access media to be selected for play back.

Additionally or alternatively, the server 901 causing the limited-access media to be available for play back may involve the server 901 transmitting a token or other data that represents a right to access the limited-access media. As an example, the server 901 may transmit 903 the token to the media playback system 100A, as shown in FIG. 9.

In some embodiments, the server 901 may also act as the media server 905 that provides the limited-access media to the media playback system 100A. In such an example, transmission of the token might not be necessary, as causing the limited-access media to be available for play back at block 806 may involve the server 901 transmitting the limited-access media to the media playback system 100A. The server 901 may provide the limited-access media to the playback device 200A, the particular playback device 200C, or another device in the media playback system 100A. Other examples of how the server 901 may cause the limited-access media to be available for play back are also possible.

In some examples, the server 901 may cause the limited-access media to be available for playback in the media playback system 100A by only the particular playback device 200C. Alternatively, the server 901 may cause the limited-access media to be available for playback by the particular playback device 200C as well as additional playback devices in the media playback system 100A that are bonded with, or that share a zone with, the particular playback device 200C. As yet another example, the server 901 may cause the limited-access media to be available for playback by one or more playback devices other than the particular playback device 200C. Other examples also exist.

In some examples, the server 901 may cause the limited-access media to be available for playback in the media playback system 100A for a limited time period. As discussed above, the limited time period may correspond to a promotional period for the limited-access media, a given event, or a given holiday, among other possibilities.

In some embodiments, in addition to causing the limited-access media to be available for playback by the media playback system 100A, server 901 may transmit a notification that the limited-access media is available. The notification may take a number of forms. For example, the server 901 may transmit 903 data indicating the limited-access media to the media playback system 100A, such that an indication of the limited-access media may then be displayed on the control device 300A as discussed above. This may provide a notification that the limited-access media is now available for play back by the media playback system 100A.

Additionally or alternatively, the server 901 may transmit a notification message in the form of an email message, text message, or a similar message indicating that the limited-access media is available for playback. For instance, the server 901 transmit the notification message to user accounts that corresponds to media playback systems including a registered particular playback device having the limited-playback device characteristic. The server 901 may also transmit the notification message to user accounts that correspond to media playback systems that do not include a registered particular playback device having the limited-playback device characteristic. In this way, the notification message may advertise the limited-access media that may be accessible to a given media playback system if a particular playback device having the limited-playback device characteristic were added to the system.

After the server 901 has caused the limited-access media to be available for playback by the media playback system 200A, the playback device 200A may request the limited-access media. For example, as shown in FIG. 9, the playback device 200A may request 904 the limited-access media from a computing system, such as a media server 905. In some cases, the playback device 200A may request 904 the limited-access media from server 901, and thus the server 901 may also be the media server 905.

Further, the playback device 200A may transmit, either in conjunction with or separately from the request, the token indicating the right to access the limited-access media. In FIG. 9, the token may be transmitted along with the request 904 for the limited-access media. In some cases, the media server 905 may verify the token before providing the limited-access media. Alternatively, the media server 905 may send a message 906 to the server 901 to validate the token. The server 901 may then send a confirmation message 907 to the media server 905 indicating that the token is valid. The media server 905 may then transmit the limited-access media to the playback device 200A, which may then cause the limited-access media to be played back one or more playback device(s) in the media playback system 200A.

In some embodiments, after receiving the identification message including the device identifier at block 802, the server 901 may register the particular playback device 200C with the media playback system 100A. For instance, the server 901 may be in communication with multiple media playback systems, and may maintain a registry including the serial numbers of each playback device, including particular playback devices having the limited-playback device characteristic, that is registered with each media playback system. Such a registry may also facilitate the sending of notification messages regarding the availability of limited-access media, as discussed above.

Based on the registration of the particular playback device 200C with a media playback system 100A, the server 901 may determine whether and how the particular playback device 200C may affect other media playback systems if it is incorporated into those systems. For example, after registration, the particular playback device 200C may be moved to a second media playback system. FIG. 9 shows a second operating environment 900B, including a second media playback system 100B and playback device 200B. The playback device 200B does not include the limited-playback device characteristic, nor does any playback device in the media playback system 100B.

In some examples, if the server 901 receives 909 an indication of the particular playback device 200C in the second media playback system 100B, it might not cause the limited-access media to be available for playback by the second media playback system 100B. Alternatively, the server 901 may detect the particular playback device 200C in the second media playback system 100B and determine that the particular playback device 200C is already registered with a different media playback system (i.e., media playback system 200A). The server 901 may then cause the limited-access media to be available for play back in the second media playback system 200B.

For example, the server 901 may then cause the limited-access media to be available for play back in the second media playback system 200B for a "sample" or "sharing" time period. The "sample" or "sharing" time period may be limited, lasting only hours or days. However, it may nonetheless allow the owner of the media playback system 100A and the particular playback device 200C to share the access to the limited-access media with others in a second operating environment 900B, allowing them to experience the limited-access media. Other possibilities exist as well.

The server 901 may also cause the limited-access media to be available for play back by the second media playback system 100B in any of the other ways discussed above. For instance, the server 901 may transmit 910 data indicating the limited-access media that may be displayed on a control device 300B of the second media playback system 100B. The server 901 may further transmit 910 a copy of the token to the second media playback system 100B. In some cases, the token may expire after the "sample" or "sharing" time period ends.

Accordingly, the second media playback system 100B may request 911 the limited-access media from the media server 905, and the request 911 may further include a transmission of the token. As discussed above, the media server 905 may validate the token, or it may exchange validation messages 906, 907 with the server 901 to validate the token. The second media playback system 100B may then receive 912 the limited-access media from the media server 906.

In some additional embodiments, after receiving the identification message including the device identifier at block 802, the server 901 may register the particular playback device 200C with a user account that is associated with the media playback system 100A. The user account may correspond to, for instance, the owner of media playback system 100A. The registration of the particular playback device 200C with the user account may be in addition to, or instead of, registration of the particular playback device 200C with the media playback system 100A.

Registration of the particular playback device 200C with the owner's user account may allow the owner to share access to the limited-access media in additional ways. For example, after registering the particular playback device 200C with the user account associated with the first media playback system 200A, the server 901 may detect an indication of the user account in the second media playback system 100B. For example, the owner of the first media playback system 100A may go to a friend's house, which includes the second media playback system 100B, and login to the second media playback system 100B.

In another example, the owner may bring control device 300A (e.g., the owner's smartphone) into the second media playback system 100B. The control device 300A of the first media playback system 100A may also be registered with the user account. Thus, the server 901 may detect an indication of the user account in the second media playback system 100B by detecting the control device 300A that is registered with the user account. Other examples are also possible.

Based on the detected indication of the user account in the second media playback system 100B, the server 901 may cause the limited-access media to be available for playback by the second media playback system 100B. For example, the limited-access media may be available for playback by the second media playback system 100B for as long as the control device 300A remains within the second media playback system 100B. In some cases, the server 901 may provide data indicating the limited-access media to only the control device 300A. Alternatively, the server 901 may provide data indicating the limited-access media to the control device 300A, the control device 300B, and any other control devices in the second media playback system 100B.

In another example, the server 901 may, based on the detected indication of the user account, transmit a copy of the token to the second media playback system 100B. The token may expire after the "sample" or "sharing" time period ends. In yet another example, the token provided by the server 901 to the first media playback system 100A may be stored in memory on the control device 300A during regular operation within the first media playback system 100A. Thus, when the control device 300A is within the second media playback system 100B, transmission of another token by the server 901 might not be necessary. Other examples of how the server 901 may cause the limited access media to be available for playback by the second media playback system 100B are also possible.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

As indicated above, the present application involves the play back of limited-access media in a media playback system based on the presence of a particular playback device within the media playback system. In one aspect, a playback device is provided. The playback device includes a processor, a network interface, a non-transitory computer-readable medium, and program instructions stored on the non-transitory computer-readable medium that, when executed by the processor, cause the playback device to perform functions including a) receiving, by the playback device, limited-access media, where the limited-access media corresponds to a limited-playback device characteristic; b) determining that a particular playback device having the limited-playback device characteristic is active in a media playback system, where the particular playback device is within the media playback system; and c) based on determining that the particular playback device having the limited-playback device characteristic is active in the media playback system, causing the media playback system to play back the limited-access media.

In another aspect, a method is provided. The method involves receiving, by a computing system, an identification message comprising a device identifier of a particular playback device in a media playback system; determining, based on the received device identifier, that the media playback system is permitted to access limited-access media, where the limited-access media corresponds to a limited-access playback device characteristic of the particular playback device; and based on the determination that the media playback system is permitted to access the limited-access media, causing the limited-access media to be available for play back by the media playback system.

In yet another aspect, a method is provided. The method involves receiving, by a playback device in a media playback system, limited-access media, where the limited-access media corresponds to a limited-access playback device characteristic; determining, by the playback device, that a particular playback device having the limited-access playback device characteristic is active in the media playback system; and based on determining that the particular playback device having the limited-access playback device characteristic is active in the media playback system, causing the media playback system to play back the limited-access media It will be understood by one of ordinary skill in the art that this disclosure includes numerous other embodiments. It will be understood by one of ordinary skill in the art that this disclosure includes numerous other embodiments. While some examples described herein may refer to functions performed by given actors such as "users" and/or other entities, it should be understood that this description is for purposes of explanation only. The claims should not be interpreted to require action by any such example actor unless explicitly required by the language of the claims themselves.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A controller device comprising:
   at least one processor;
   at least one non-transitory computer-readable medium;
   program instructions stored on the at least one non-transitory computer-readable medium that are executable by the at least one processor such that the controller device is configured to:
   based on a determination that a first group of playback devices includes a particular playback device having a limited-playback device characteristic, display, on a graphical display of the controller device, first information for the first group, the first information including an indication of limited-access media that is available for playback by any playback device of the first group, wherein at least one other playback device of the first group does not have the limited-playback device characteristic; and
   based on a determination that a second group of playback devices does not include the particular playback device having the limited-playback device characteristic, display, on the graphical display of the controller device, second information for the second group, the second information not including an indication of the limited-access media;
   wherein the limited-playback device characteristic of the particular playback device enables access to the limited-access media by the first group but not the second group, and wherein the limited-access media is selectable for playback by the first group via the indication of the limited-access media.

2. The controller device of claim 1, wherein the limited-playback device characteristic includes at least one of: an identifier of the particular playback device; a model of the particular playback device; a technical configuration of the particular playback device; or a token associated with the particular playback device.

3. The controller device of claim 1, wherein the first group and the second group are part of a same media playback system.

4. The controller device of claim 3, wherein the at least one non-transitory computer-readable medium further comprises program instructions that are executable by the at least one processor such that the controller device is configured to:
   display a list of media sources available to the media playback system; and
   display an indication that a given media source in the list of media sources provides access to the limited-access media that is only playable by the first group.

5. The controller device of claim 1, wherein the at least one non-transitory computer-readable medium further comprises program instructions that are executable by the at least one processor such that the controller device is configured to:
   based on a determination that the particular playback device has been removed from the first group and added to the second group:
      display, on the graphical display of the controller device, first updated information for the first group, the first updated information not including the indication of limited-access media; and
      display, on the graphical display of the controller device, second updated information for the second group, the second updated information including the indication of the limited-access media.

6. The controller device of claim 1, wherein the at least one non-transitory computer-readable medium further comprises program instructions that are executable by the at least one processor such that the controller device is configured to:
   send a request for the limited-access media to a media source; and
   cause the first group of at least one first playback device to play back the limited-access media.

7. The controller device of claim 1, wherein the at least one non-transitory computer-readable medium further comprises program instructions that are executable by the at least one processor such that the controller device is configured to:
   based on a received request for the limited-access media, cause at least one playback device in the first group to obtain the limited-access media from a media source.

8. The controller device of claim 7, wherein the at least one playback device comprises the particular playback device.

9. The controller device of claim 7, wherein the at least one playback device comprises any playback device in the first group.

10. The controller device of claim 1, wherein the particular playback device and the at least one other playback device of the first group operate as bonded playback devices.

11. The controller device of claim 10, wherein the particular playback device and the at least one other playback device are configured to play back media in synchrony.

12. At least one non-transitory computer-readable medium, wherein the at least one non-transitory computer-readable medium is provisioned with program instructions that, when executed by one or more processors, cause a controller device to:

based on a determination that a first group of playback devices includes a particular playback device having a limited-playback device characteristic, display, on a graphical display of the controller device, first information for the first group, the first information including an indication of limited-access media that is available for playback by any playback device of the first group, wherein at least one other playback device of the first group does not have the limited-playback device characteristic; and based on a determination that a second group of playback devices does not include the particular playback device having the limited-playback device characteristic, display, on the graphical display of the controller device, second information for the second group, the second information not including an indication of the limited-access media;

wherein the limited-playback device characteristic of the particular playback device enables access to the limited-access media by the first group but not the second group, and wherein the limited-access media is selectable for playback by the first group via the indication of the limited-access media.

13. The at least one non-transitory computer-readable medium of claim 12, wherein the limited-playback device characteristic includes at least one of: an identifier of the particular playback device; a model of the particular playback device; a technical configuration of the particular playback device; or a token associated with the particular playback device.

14. The at least one non-transitory computer-readable medium of claim 12, wherein the first group and the second group are part of a same media playback system.

15. The at least one non-transitory computer-readable medium of claim 14, wherein the at least one non-transitory computer-readable medium is also provisioned with program instructions that, when executed by one or more processors, cause the controller device to:
display a list of media sources available to the media playback system; and
display an indication that a given media source in the list of media sources provides access to the limited-access media that is only playable by the first group.

16. The at least one non-transitory computer-readable medium of claim 12, wherein the at least one non-transitory computer-readable medium is also provisioned with program instructions that, when executed by one or more processors, cause the controller device to:
based on a determination that the particular playback device has been removed from the first group and added to the second group:
display, on the graphical display of the controller device, first updated information for the first group, the first updated information not including the indication of limited-access media; and
display, on the graphical display of the controller device, second updated information for the second group, the second updated information including the indication of the limited-access media.

17. The at least one non-transitory computer-readable medium of claim 12, wherein the at least one non-transitory computer-readable medium is also provisioned with program instructions that, when executed by one or more processors, cause the controller device to:
send a request for the limited-access media to a media source; and
cause the first group of at least one first playback device to play back the limited-access media.

18. The at least one non-transitory computer-readable medium of claim 12, wherein the at least one non-transitory computer-readable medium is also provisioned with program instructions that, when executed by one or more processors, cause the controller device to:
based on a received request for the limited-access media, cause at least one playback device in the first group to obtain the limited-access media from a media source.

19. The at least one non-transitory computer-readable medium of claim 18, wherein the at least one playback device comprises the particular playback device.

20. A method to be performed by a controller device, the method comprising:
based on a determination that a first group of playback devices includes a particular playback device having a limited-playback device characteristic, displaying, on a graphical display of the controller device, first information for the first group, the first information including an indication of limited-access media that is available for playback any playback device of the first group, wherein at least one other playback device of the first group does not have the limited-playback device characteristic; and
based on a determination that a second group of playback devices does not include the particular playback device having the limited-playback device characteristic, displaying, on the graphical display of the controller device, second information for the second group, the second information not including an indication of the limited-access media;
wherein the limited-playback device characteristic of the particular playback device enables access to the limited-access media by the first group but not the second group, and wherein the limited-access media is selectable for playback by the first group via the indication of the limited-access media.

\* \* \* \* \*